Aug. 8, 1944.   H. J. B. SCHARNBERG   2,355,397
LIQUID TREATING AND ANTI-SHORT-CIRCUITING DEVICE
Filed Feb. 1, 1941   4 Sheets-Sheet 1
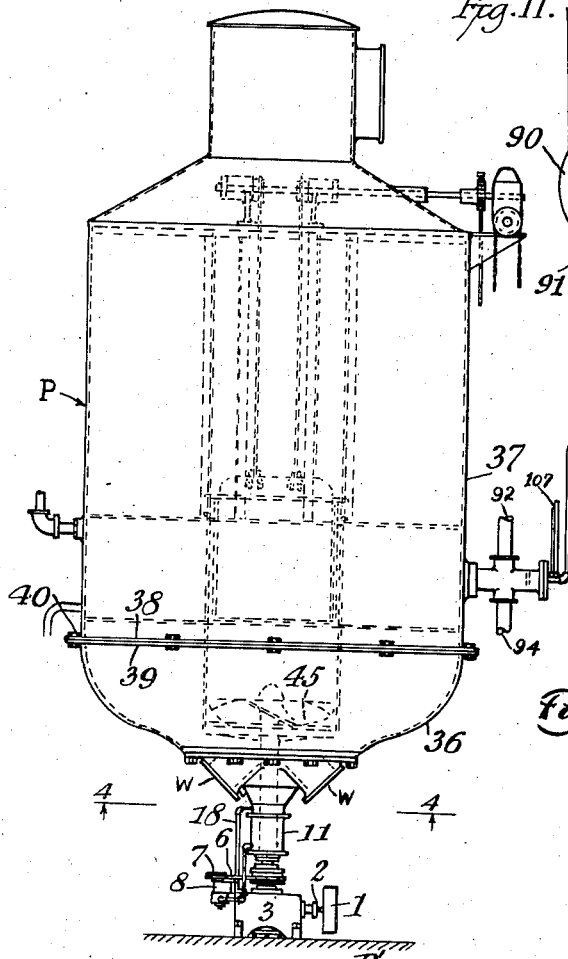
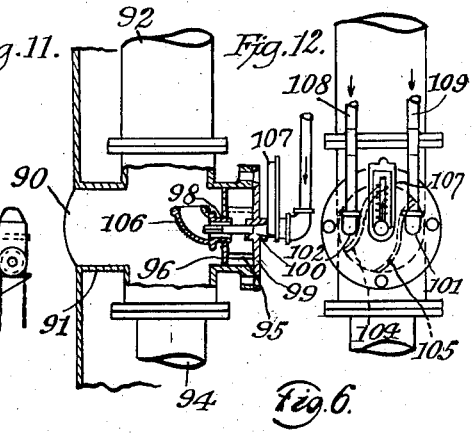
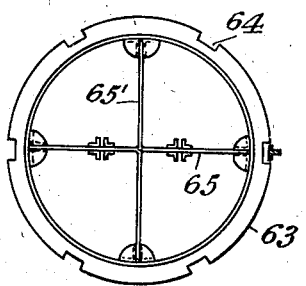
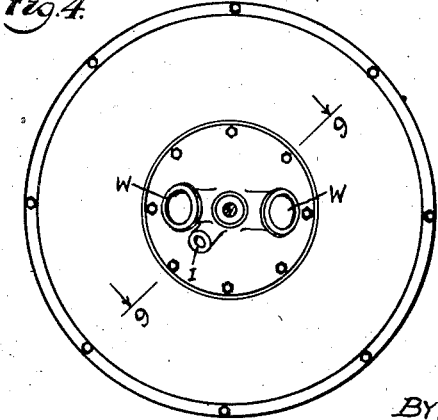
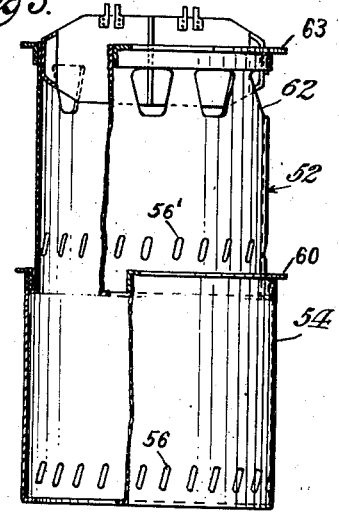
INVENTOR;
Herman J. B. Scharnberg,
DECEASED, BY MARIE MARGARET
SCHARNBERG, EXECUTRIX
By Harold D. Penney   ATTORNEY.

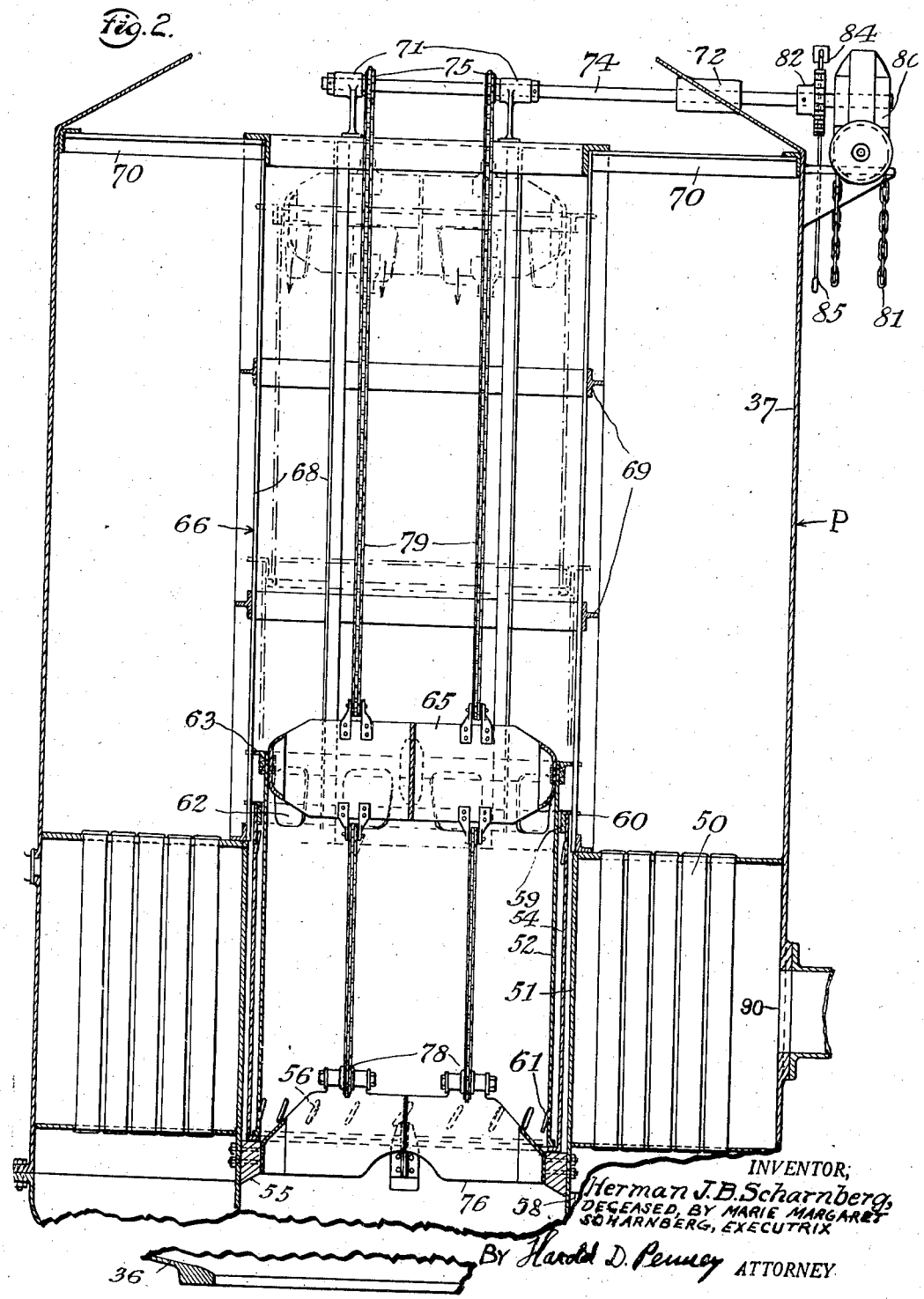

Aug. 8, 1944.  H. J. B. SCHARNBERG  2,355,397
LIQUID TREATING AND ANTI-SHORT-CIRCUITING DEVICE
Filed Feb. 1, 1941  4 Sheets-Sheet 3
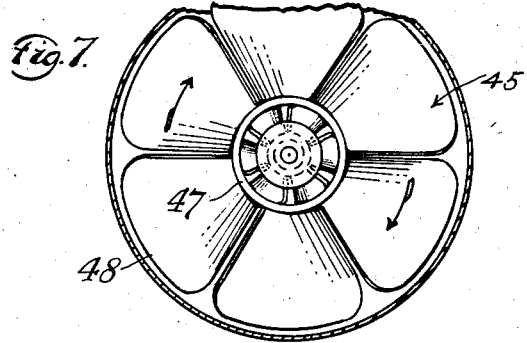
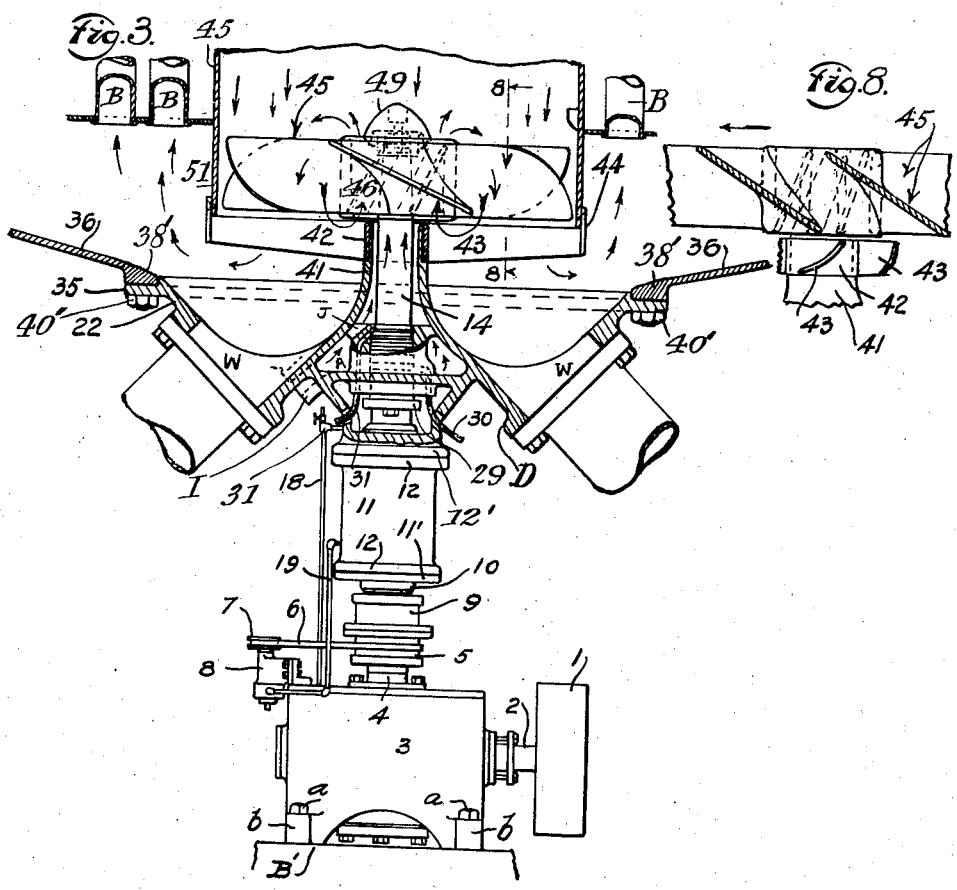
INVENTOR;
Herman J. B. Scharnberg.
DECEASED, BY MARIE MARGARET
SCHARNBERG, EXECUTRIX
By Harold D. Penney ATTORNEY

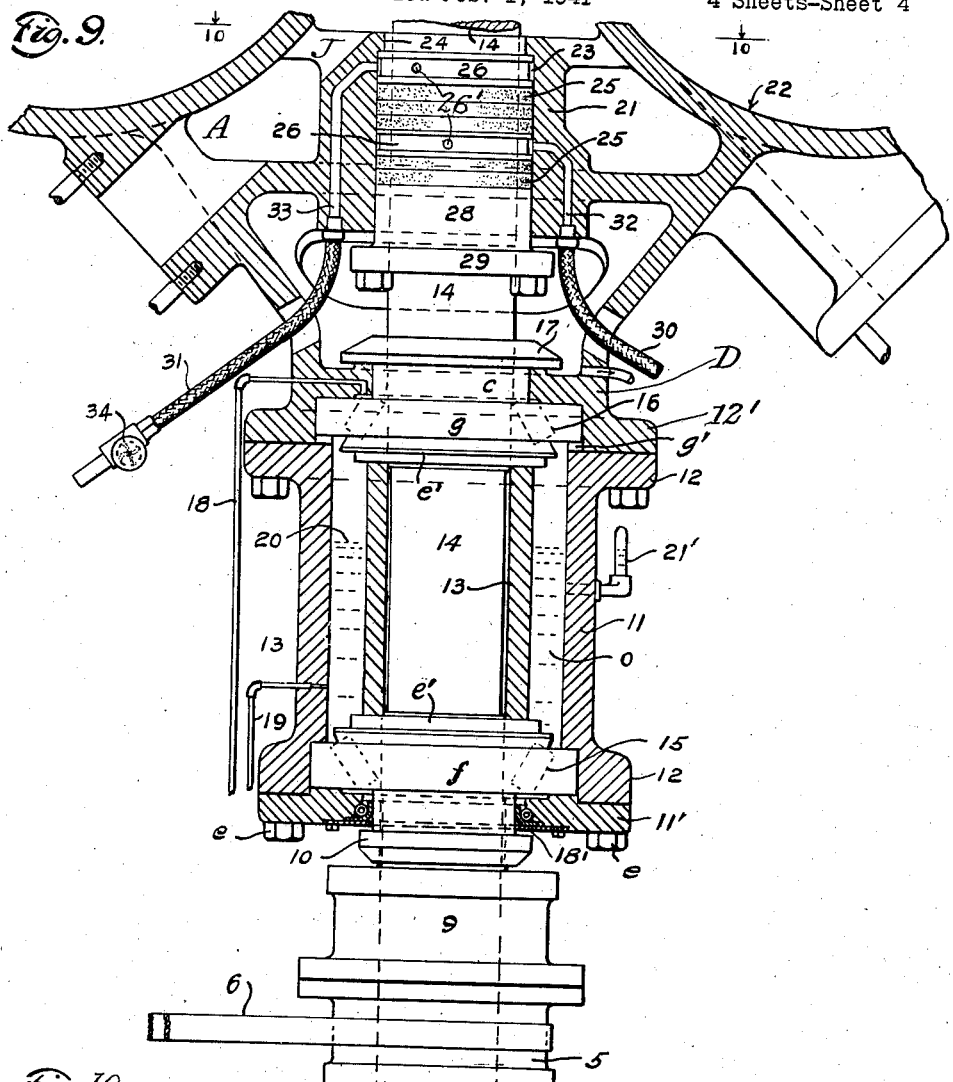
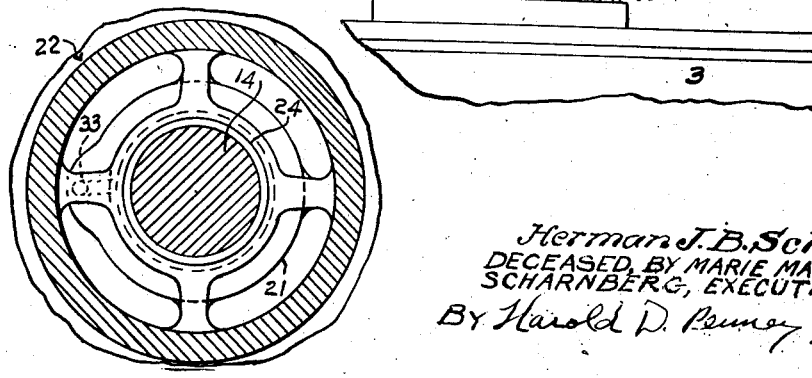

Patented Aug. 8, 1944

2,355,397

UNITED STATES PATENT OFFICE 2,355,397

LIQUID-TREATING AND ANTI-SHORT-CIRCUITING DEVICE

Herman J. B. Scharnberg, deceased, late of Clewiston, Fla., by Marie Margaret Scharnberg, executrix, Clewiston, Fla., assignor to herself Application February 1, 1941, Serial No. 377,068

18 Claims. (Cl. 159—25)

The present invention relates to a liquid or semi-liquid treating device, whereby a plurality of liquids or semi-liquids of like nature but of unlike viscosities and qualities may be admixed rapidly and efficiently into a single body, having a common viscosity which is the resultant of the varying viscosities of the various bodies in the final combined end-product.

In illustration of the foregoing, such a use may be in the preparation of a lubricating oil, whereby various purified hydrocarbons of different viscosities, or Baumé densities, may be fed into the present apparatus and admixed or treated into a single lubricating body of desired viscosity, the body of such lubricant being varied to suit the varied lubricating uses, by the introduction of such hydrocarbon aggregates of desired varying and controlled viscosities, in predetermined volumes as will ultimately result in the desired viscosity of the end-product lubricating product.

A further feature of advantage, is that, aside from the functions above noted, the herein device may be also used, as as improved vacuum pan of the type used in the manufacture of sugar, from the viscous massecuite, or sugar mass, wherein the same during cooking operation is uniformly circulated and recirculated therethrough, and admixed, in the evaporating pans in an improved manner. This treatment of the sugar mass is done under a vacuum.

In the use of the present device, as a sugar homogenizer, liquid or semi-liquid sugar masses of varying viscosities are introduced, heated, homogenized and evaporated.

In use in the sugar making art, especially, in relation to the extraction of sugar or massecuite from sugar cane, it is the practice to boil the sugar mass, or massecuite in the pan to concentrate the same and at the same time to cause uniform, but energetic circulation of the mass through the pan, while simultaneously subjecting the circulating mass to the means for and evaporating the same.

The power requirement is much less in the case of the present device since superior circulation is obtained with only one propeller. This superior circulation results in a more uniform crystalline product and prevents undesirable gumming of moving parts.

The features next above noted, constitute some of the features of advantage herein, including other structural advantages, as will be hereinafter noted in detail, and it will be noted that modifications may be made in the details of the structure herein disclosed, without departing from the spirit hereof or the scope of the appended claims.

In the drawings,

Fig. 1 is a side view, in elevation, on a reduced scale, of the herein disclosed vacuum, circulating pan;

Fig. 2 is a fragmentary, transverse, sectional view, partly in elevation, on a larger scale, of the vacuum pan, to show certain interior, structural details;

Fig. 3 is an enlarged, fragmentary, transverse sectional view, partly in elevation of the lower mass circulating and heating pan of Fig. 1;

Fig. 4 is a section taken on the line 4—4, Fig. 1, looking in the direction of the arrows;

Fig. 5 is a reduced view, in side elevation of the internal, telescopic riser or downtake extended to its full height;

Fig. 6 is a plan of Fig. 5;

Fig. 7 is a plan of the impeller of Fig. 3;

Fig. 8 is a vertical section of the impeller, taken on the line 8—8, Fig. 3, looking in the direction of the arrows;

Fig. 9 is an enlarged, fragmentary, sectional view of the impeller driving spindle and bearings;

Fig. 10 is a transverse, broken sectional view taken on the line 10—10, Fig. 9, looking in the direction of the arrows;

Fig. 11 is an enlarged fragmentary sectional view, partly in elevation of the mixing chamber of Fig. 1; and Fig. 12 is an end view of the chamber of Fig. 11.

A vacuum pan or evaporator P has a mechanism for homogenizing liquid therein. The mechanism may comprise a main concrete base or foundation generally denoted by B', Fig. 3, upon which is mounted a housing 3, in which is located a right angled motion translation means such as a worm and worm gear of well known type, the worm being mounted upon the worm shaft 2, which shaft is driven from a primary power source, not shown, preferably by means of a belted pulley 1. The gear housing 3 may be attached to the foundation B' by suitable bolts a, which pass through integral housing fastening lugs b, Fig. 3.

A central main shaft 14, Fig. 9, which carries the driven worm gear, not shown, which is driven by worm shaft 2, is broken by a flexible coupling, the exterior housing 9 of which is only shown, Figs. 3 and 9, whereby a desired degree of driving flexibility between the fixed right angled worm and worm gear drive means and the main, upright, or vertical drive shaft 14 is accomplished.

Between the flanged gear housing cap 4, which is bolted to the top of the housing 3, by bolts d, Fig. 9, is vertically mounted a cylindrical pulley member 5, this latter member being fixed mounted upon and to be driven by shaft 14. An endless driven belt 6 carried upon said pulley 5, is connected to a drive pulley 7, which is rotatably connected to the shaft of an oil pump generally denoted by 8, Fig. 3, said pump being suitably and fixedly connected to the housing 3. During operation of the apparatus, the oil pump conducts and constantly maintains a lubrication pressure upon certain bearings, as will be later described, in detail.

An outer bearing housing 11, Figs. 3 and 9 has attached to its lower flange 12, an oil seal retainer ring 11' by bolts e, Fig. 9, said ring having a recess in its inner face, whereby to mount a suitable rigid oil seal packing means, generally denoted by 18', Fig. 9, which surrounds an adjustable, flanged, threaded bearing nut 10, which may be threadedly mounted for such adjustment upon shaft 14, to be rotated thereby and so as to fixedly clamp the inner rings 15 and 16 of two standard roller thrust bearings f and g tightly with the shaft 14, by means of a spacer sleeve 13, the upper inner bearing of thrust ring e being held against an integral thrust shoulder c on shaft 14. This construction locks the inner roller rings or races e' on the shaft 14, and thus rotation of said shaft causes said rings to rotate with said shaft.

The outer roller ring f, Fig. 9, of roller ring bearing 15 is fixedly mounted in a recess in the lower flange 12 of housing 11, and the outer roller ring g of the upper bearing 16 is seated fixedly in a recess g' located in the lower flange 12' of a header generally designated as D.

The annular chamber O formed between the outer face of the spacer sleeve 13 and the inner face of housing 11 is filled with oil to keep the lower roller bearing constantly lubricated.

The upper roller bearing g is also constantly lubricated by means of an oil pipe 18 which is connected to the oil pump 8, and as the oil passes through the upper roller bearing 16, downwardly into the chamber O, the oil reaches a maintained level 20, which is indicated by an exterior gauge level indicator 21', Fig. 9, and the residual oil is drawn out by the pump 8 from the chamber O, and again circulated through bearing 16. Thus the roller bearings and part of flange ring 10 are constantly kept in a controlled bath of oil.

The shaft 14, Fig. 9, extends upwardly through a bearing sleeve 21, which is integral with the interior of the lower end header D, the said bearing being provided with an interior cylindrical recess 23, with an annular flange 24 at its upper end, through which the shaft 14 extends.

A series of compressible packing rings 25 surround the shaft 14 at this point, and non-compressible water and oil directing piston rings 26 are interspersed between the compressible packing rings 25, and the ring assembly is then compressed together by means of a cylindrical, flanged packing gland 28, the exposed flange 29 of which is bolted to the lower face of the bearing sleeve 21, to cause the above described assembly to act as a compressible stuffing box for shaft 14.

As the shaft 14 rotates in said stuffing box assembly, lubricating oil is conducted to the rings 26—26 by inlet and outlet tubes 30—31, which by means of ducts 32—33 to which said tubes are connected, the oil, under pressure, from a source not shown, is passed from said rings to the rotary surface of the shaft 14 and the inner shaft bearing faces of the rings 26 and 25, by means of ports 26'. The admission of oil, in rings 26—26 to the stuffing box may be regulated by some such means as a hand valve 34, Fig. 9.

The upper portion 22 of the header, or D, as may be seen in Fig. 3, is provided with a bolt flange 35, whereby it may be attached by means of bolts 40' to a lower funnel-like header 36, said header being in turn attached to the flange of the outer cylindrical housing 37, flanges 38—39, by bolts 40 as shown in Fig. 1.

In Fig. 3, the header D, is provided with an upstanding central cone-like cylindrical stem or tube 41, through and beyond which shaft 14 extends, and upon the outer terminus of which is suitably affixed a homogenizing impellor, generally denoted by 45, Figs. 1, 3 and 8.

The upper portion 22 has a smoothly curved upper face to enable smooth flow of liquid downwardly under the impellor and then upwardly and outwardly in the outer portions of the pan forming a basin like bottom to the pan having opposed discharge openings W. Said header D is provided with a feed inlet I communicating with the chamber A from which the feed liquid may pass into the annular space between the shaft 14 and the stem 41 by means of passage as at J.

A circulator 45 comprises an inner propeller having a plurality of short lowly pitched inner blades 46 for raising feed entering through the stem 41; the inner blades having a cylindrical partition 47 around their peripheral ends and coaxial with the drive shaft 14. Outer long blades 48 of greater than and opposite pitch to the inner blades radially project from the partition 47 to form an outer propeller. A nose cap 49 is provided for the hub portion of the inner propeller. The outer blades 48 cause heavy liquid within the pan to be drawn downwardly with relative linear velocity while the inner blades cause the light liquid to be raised with less velocity so that the down coming liquid forces the light liquid to regions having the greater liquid density.

The pan P has a horizontal calandria 50 Fig. 2 having a cylindrical central down take formed by a wall 51 projecting downwardly into the lower portion of said evaporator to the lower edges of the circulator 45. Rectifying blades 43, Fig. 3, provided with curved flanges 42 are mounted on stem 41 and have mounting flanges 44 secured to the lower margin of downtake wall 51 said rectifying blades being radially mounted on the stem and downtake wall and of opposite pitch to the propeller blades 48.

Inner and outer telescoping downtake sleeves 52 and 54 are loosely vertically slidably received in said down take; and in lowered positions, rest on a plurality of opposed blocks 55 mounted on the inner face of said downtake wall with their upper faces in a plane slightly below the bottom of said calandria 50. The outer sleeve 54 is provided with a multiplicity of slanting slots 56 in its lower portion to provide passage of the fluid from within the outer sleeve to the annular space between the last mentioned sleeve and the downtake wall 51 so as to prevent gumming during operation of the evaporator.

The outer sleeve 54 is provided with an internal flange 58 at its lower end and has an internal retaining rib 59 at and an outstanding guide flange 60 at the upper end and is provided with an external retaining rib 61 at its lower end to engage the internal retaining rib 59 and to prevent the two sleeves from coming apart. The lower portion of said inner sleeve 52 is provided with slating slots 56' to allow passage of the liquid from the inner side to the outer side of the sleeve and prevent gumming. The upper portion of the inner sleeving projects upwardly and has circumferentially spaced over-flow ports 62 with their lower parts slightly above the level of the top of the calandria 50 when the two sleeves are in the lowest position, said ports allowing low density liquid to pass into the down-take where it meets heavier liquid. The upper portion of said inner sleeve is provided with an external guide rib 64 and a diametring hoisting plate or bail 65 and a diametric strengthening member perpendicular thereto.

A cage guide 66 in vertically axial alignment over said down-take and including circumferentially spaced vertical guide bars 68 is mounted on the down-take margins of the upper part of the calandria 50 for guiding the two sleeves as they are hoisted and to hold the outer sleeve 54 in annularly spaced relation to the down-take wall 51 when the sleeve is in lowered position. The upper part of said guide bars being circumferentially mounted in the upper portion of said evaporator. Reinforcing hoops 69 are mounted around said guide bars 68 and radial stays 70 are mounted on the upper end of the cage guide 66 and the upper part of the evaporator to hold the cage in position. Axially aligned horizontal hoist sprocket bearings 71 are mounted on the upper part of said cage guide by means of parallel cross pieces not shown in the drawings.

A packed bearing 72 extends through the upper part of the evaporator in axial alignment with said bearings 71 and a hoist shaft 74 mounted in the bearings 71 and 72 projects through the packed bearing clear of the evaporator side wall 37. A pair of hoist sprockets 75 are mounted on said shaft. These spockets and bearings 71, 72 are located so that the peripheries of the sprockets are vertically above to points on the hoisting plate 65 equidistant from the vertical axis of the inner sleeve 52. A guide sprocket support plate 76 lying in a vertical plane and parallel to the shaft 74 is mounted on the blocks 55 in the lower portion of the down-take and has bearingly mounted thereon axially horizontal guide sprockets 78 having their peripheries vertically aligned with peripheries of the hoist sprockets 75. A pair of hoist chains 79 are attached to the hoist plate 65 at points under the sprockets 75 thereon and pass upwardly within the guide 66 and over said hoist sprockets 75 downwardly and under the guide sprockets 78 up to points on the lower edge of the hoist plate 65 under the points of attachment at the upper edge to form a positive elevating and lowering chain belt. A worm drive of well known type 80 is mounted on the upper outside of said pan to drive said shaft 74 and is powered by a pending endless hand chain 81. A ratchet wheel 82 is mounted on said hoist shaft 74 with a pawl 84 engaging the wheel. A rope 85 is provided for manually lifting said pawl out of engagement.

The calandria 50 is provided with an inlet 90 for steam and vapor comprising a cross pipe 91 Fig. 11 having one opening communicating with the calandria, the two adjacent openings being axially vertical, the upper opening communicating with a large vapor inlet 92 and the lower with a steam inlet 94. The outer opening opposite the calandria connection is adapted to form a hot and cold water mixing chamber 95. The chamber comprises the cylindrical wall of said outlet and a round vertical partition disk 96 provided with a central aperture 98 and peripherally mounted on the inner face of the outer opening wall. A cover plate 99 having a central thermometer hole 100 is mounted over the flanged end of said opening and is provided with hot and cold water inlet holes 101, 102 respectively communicating with said interior of said chamber. Two curved deflecting vanes 104, 105 each having an end mounted on the wall of said opening and one edge mounted on the partition and the other edge in near contact with the cover plate, each forms a flow space at each of last mentioned inlets to impart mixing motion to the water. A small nipple in said aperture in said partition communicates with the chamber and the calandria and an upwardly open elbow 106 is screwed on the calandria end of said nipple. A thermometer is mounted in said thermometer hole to indicate the temperature of water leaving said nipple. Hot and cold water pipes 108 and 109 provided with control valves not shown are connected to the inlet holes in said cover plate.

Two methods of operation may be used with the vacuum pan. First, mother liquid or syrup can be drawn in the pan to a predetermined height and the supply then cut off. The sleeve 52 is then raised to a height so that only the liquid at the top of the charge can overflow through the ports 62 into the sleeves 52 and 53 and pass through the down-take. Steam is turned into the calandria 50 and the pan P put under vacuum. As the water in the charge evaporates the height of the sleeve must be lowered, and the charge becomes concentrated and sugar crystals begin to form. When this stage is reached additional syrup is evenly and constantly drawn in through the inlet I and passed up the inner portion of the propeller 45 where it is met by more concentrated liquid drawn downwardly through the down-take. The path of the feed syrup is thus reversed and the relatively thin liquor is forced to the bottom portion of the pan where the heavy concentrated portion of the charge tends to settle under gravity. The sleeves 52 and 54 prevent liquor having just passed upwardly through the calandria from being short circuited back through the down-take and force it to rise through the upper portion of the charge where the thin liquid tends to accumulate.

The above feed and circulation system result in a uniform concentration of the charge and an even growth of sugar crystals. Throughout operation of the pan the sleeves are raised or lowered to keep the ports 62 at such a height so that only the top of the charge can enter the down-take.

In the second method of operation a charge of massecuite or seed grain containing sugar seed crystals is introduced and the steam turned on and the pan put under vacuum. As soon as the mass begins to boil, a high grade molasses or syrup is introduced at a constant rate. The sleeves are always kept at such a height to prevent short circuiting as in the first method.

When the evaporation is complete the charge is cooled with water at a desired temperature by mixing hot and cold water in the chamber and passing the warm water through the calandria. The product is then discharged through the opening in the lower part of the pan.

Having thus described the invention what is claimed is:

1. In an apparatus for treating liquids a large vertical cylindrical container having a horizontal liquid distributor provided with a central down-take; telescoping sleeves vertically slidable in said down-take to provide a central down-take tube extending below the distributor and to a height approximately equal to the level of liquid to be treated in the container; a propeller mounted axially vertical in the lower part of said down-take and having inner blades for raising liquid and longer outer blades extending therefrom for forcing liquid downwardly at lesser linear velocity; a vertical drive shaft for said propeller; and a feed inlet for low density liquid surrounding said shaft and under said propeller; the bottom of said container being curved to facilitate reversing the downward flow of liquid from the down-take to upward flow through the distributor.

2. An apparatus for treating liquids comprising a container having a horizontal calandria provided with vertical tubes mounted near the bottom thereof and provided with a central down-take well; telescoping sleeves vertically slidable in said down-take well to provide a down-take tube extending below the calandria and to a height slightly below the level of liquid in the container to prevent liquid being drawn into the down-take immediately after passing upwardly through the calandria, said sleeves being provided with a plurality of spaced openings in their respective lower end portions to provide a small amount of short circuiting of the sleeves to prevent gumming at outer surfaces thereof and means for raising and lowering said sleeves.

3. In a liquid treating apparatus, an element having a down-take; telescoping anti-short circuiting sleeves slidably received in said down-take; a cage guide for said sleeves in axial alignment over said down-take and including circumferentially spaced vertical guide bars loosely engaging said sleeves and mounted on the down-take margins of the upper part of said element for guiding the two sleeves as they are extended and to hold the outer sleeve in annularly spaced relation to the down-take when the sleeve is in lowered position; the upper part of said guide bars being circumferentially mounted on the upper portion of said apparatus; reinforcing hoops mounted around said guide bars; and radial stays mounted on the upper end of the cage guide and the upper part of the evaporator to hold the cage in axially aligned position.

4. A vacuum pan having a bottom comprising an inverted funnel shaped hollow stem projecting upwardly into the interior of said pan; a propeller shaft extending upwardly through said stem and bearingly mounted in annular spaced relation thereto so as to form a feed inlet between said shaft and the inner face of said stem.

5. A pan having a horizontal calandria provided with vertical open tubes and having a cylindrical central down-take having a cylindrical down-take wall projecting downwardly into the lower portion of said pan; inner and outer telescoping down-take sleeves loosely vertically slidably received in said down-take; said outer sleeve being of slightly greater height than the calandria and having an internal flange at its lower end and an internal retaining rib at the upper end; said inner sleeve being provided with an external retaining rib at its lower end to engage the internal retaining rib to prevent the two sleeves from coming apart, the lower portion of each of said sleeves being provided with slanting slots to allow outward passage of the liquid from within the sleeves and prevent gumming, the upper portion of the inner sleeve projecting upwardly above the outer sleeve and having circumferentially spaced over-flow ports with their lower parts slightly above the level of the top of the calandria when the two sleeves are in the lowest position, said ports allowing low density liquid to pass into the down-take to meet heavier liquid, and means for raising and lowering the inner sleeve.

6. In an evaporator having a down take well and for a liquid having varying density; a vertical shaft mounted in axial alinement with said well; a propeller having inner blades of one pitch and outer blades of opposite pitch and mounted axially vertical in said well; an annular inlet below the inner blades of said propeller and surrounding said shaft; said inner blades forcing feed liquor upwardly and said outer blades forming the charge liquid from the upper zone downwardly; whereby the feed liquor is forced counter current to the portion of the charge having the lowest density thereby resulting in improved mixing, reducing power consumption and preventing the incorporation of slugs of feed liquor in the heaviest portions of the charge.

7. In an evaporator having a down take well and for a liquid having varying density; vertically telescoping sleeves cooperating with the walls of said down-take well, whereby only the charge liquid from only the upper zone of the charge may enter said well; a vertical shaft mounted in axial alinement with said well; a propeller having inner blades of one pitch and outer blades of opposite pitch and mounted on said shaft and in said well; an annular inlet below the inner blades of said propeller and surrounding said shaft; said inner blades forcing feed liquor upwardly and said outer blades forcing the charge liquid from the upper zone downwardly; whereby the feed liquor is forced counter current to the portion of the charge having the lowest density thereby resulting in improved mixing, reducing power consumption and preventing the incorporation of slugs of feed liquor in the heaviest portions of the charge.

8. A pan having a horizontal calendria provided with vertical open tubes and having a cylindrical downtake wall projecting downwardly into the lower portion of said pan; inner and outer telescoping down-take sleeves loosely vertically slidably received in said down-take; said outer sleeves having an internal retaining rib at the upper end; said inner sleeves being provided with an external retaining rib at its lower end to prevent the two sleeves from coming apart, the lower portion of each of said sleeves being provided with apertures to allow outward passage of the liquid from within the sleeves and prevent gumming, and means for raising and lowering the inner sleeve.

9. In an evaporator for a liquid having varying density and having a down take and having means for excluding heavy portions of the liquid from a flow of liquid into said down take, a vertical shaft mounted in axial alinement with said downtake; a propeller having a hub portion provided with an axial vertical opening and mounted on said shaft and in said downtake for forcing the charge liquid in the downtake downwardly; and means forming an annular inlet below said opening in the hub and surrounding said shaft;

whereby feed liquor may be forced through the opening into the portion of the charge having little of the heavy portion thereby resulting in improved mixing, reducing power consumption and preventing the incorporation of slugs of feed liquor in the heaviest portion of the charge.

10. In an evaporator for a liquid having varying density and having a down take and having means for excluding heavy portions of the liquid from a flow of liquid into said down take, a vertical shaft mounted in axial alinement with said downtake; a propeller having a hub portion provided with an axially vertical opening for a passage therethrough and mounted on said shaft and in said downtake for forcing the charge liquid in the downtake downwardly; and means forming an inlet alined with said opening in the hub.

11. An apparatus for admixing light liquid with a mixture of liquids having different densities, said apparatus comprising means for circulating said mixture by means for applying a downward force in an annular area to the mixture to produce a down stream of the mixture and returning the mixture from the lower part of the down stream upwardly to the upper part of the stream at a sufficiently low linear velocity to permit lighter portions of the mixture to rise and the heavier portion to sink, thereby making the down stream richer in lighter portions of the mixture; means for directing an annular stream of said light liquid upwardly into the lower part of said stream; and means different from and in addition to said light liquid for applying to said light liquid an upwardly impelling force and engaging the light liquid as high as the point of application of said downward force; thereby to provide in said down stream above the lower part thereof an upwardly moving stream of said light liquid.

12. In an evaporator, a shaft movably mounted in and in the evaporator; an agitator having a mounting portion on said shaft and having outer paddles and an opening intermediate of the mounting portion and the paddles to reduce the movement caused by the paddles of liquid adjacent the shaft and means forming an inlet alined with said opening, whereby feed liquor may be forced upwardly through the opening and past the agitator.

13. In an apparatus for treating liquids, a pan; a shaft mounted for rotation and projecting into the pan; a propeller having a hub portion on the inner end of said shaft and having a set of annularly arranged blades for forcing liquid in substantially one direction and an opening intermediate of the hub portion and the blades to reduce the flow caused by the blades of liquid adjacent the shaft, and means forming an annular inlet alined with said opening, whereby feed liquor may be forced through the opening and past the propeller.

14. In an evaporator having a vertical down take, a vertical shaft rotatably mounted in axial alinement with said down take; a propeller having a hub portion on the inner end of said shaft and having a set of annularly arranged blades for forcing liquid downwardly and an opening intermediate of the hub portion and the blades to reduce the downward flow of liquid adjacent the shaft; and means forming an annular inlet below said opening and surrounding said shaft; whereby feed liquor may be forced upwardly through the opening and past the propeller.

15. An apparatus for treating liquids comprising a container having a wall provided with an aperture therein; a shaft bearingly mounted exterior of the container for movement therein and projecting therein through the aperture; means in the aperture and between the wall and the shaft for preventing a flow of fluid between the exterior and interior of the container; an agitator on the inner end of the shaft; a tube projecting from the marginal portions of the aperture and surrounding the shaft in spaced relation thereto to form an inlet space around the shaft; and means providing a liquid conducting passage to said inlet space.

16. A vacuum pan comprising a bottom wall having an aperture therein; a vertical shaft rotatably mounted beneath the pan and projecting upwardly therein through the aperture; means in the aperture and between the bottom wall and the shaft for controlling a flow of fluid between the exterior and interior of the pan; an agitator on the inner end of the shaft; a tube projecting from the marginal portions of the aperture to the propeller and surrounding the shaft in spaced relation thereto to form an inlet space around the shaft; and means providing a liquid conducting passage from the exterior of the pan to said inlet space whereby the shaft may be washed with feed liquid and undesired liquid may be kept from coming in contact wiht the shaft and the feed may be introduced adjacent the agitator.

17. In a liquid treating vessel having a downtake, an inlet tube projceting into said vessel and axially alined with the down-take; a shaft mounted for movement projecting longitudinally through said tube and spaced therefrom to provide an inlet passage; an agitator on the inner end of the shaft and within the down-take; and rectifying blades radially mounted on the tube adjacent the agitator; the tube having the double function of excluding non-feed liquor from the shaft and supporting the rectifying blades.

18. In a vacuum pan provided with a downtake well spaced from the bottom of the pan, a vertical propeller shaft projecting upwardly into said well and bearingly mounted exterior of the pan; a stuffing box in said bottom surrounding the shaft; an inlet tube surrounding said shaft above the stuffing box in spaced relation to the shaft to form a thin annular inlet space around the shaft extending from the stuffing box substantially to said well; and means for conducting a flow of liquid from the exterior of the pan to said space at a point adjacent to the stuffing box; whereby said tube and feed liquid in said space being conducted to said well will prevent portions of the charge tending to settle to the bottom of the pan from coming in contact with said shaft and stuffing box.

MARIE MARGARET SCHARNBERG,
*Executrix of the Last Will and Testament of Herman J. B. Scharnberg, Deceased.*

CERTIFICATE OF CORRECTION.

Patent No. 2,355,397. August 8, 1944.

HERMAN J. B. SCHARNBERG, DECEASED,
BY MARIE MARGARET SCHARNBERG, EXECUTRIX.

It is hereby certified that error appears in the above numbered patent requiring correction as follows: In the grant, line 13, for "Marie Margaret Scharnberg, as Executrix, her heirs" read --Marie Margaret Scharnberg, her heirs--; and that the said Letters Patent should be read with this correction therein that the same may conform to the record of the case in the Patent Office.

Signed and sealed this 26th day of September, A. D. 1944.

(Seal)
Leslie Frazer
Acting Commissioner of Patents.